United States Patent
Miyata et al.

(10) Patent No.: US 7,129,314 B2
(45) Date of Patent: Oct. 31, 2006

(54) AROMATIC AMIDE BLOCK COPOLYMER AND PROCESS OF PRODUCING THE SAME

(75) Inventors: Hiroshi Miyata, Mie (JP); Satoru Kondo, Mie (JP); Hiroshi Yamakawa, Mie (JP); Shinji Shimosato, Aichi (JP); Katsuaki Mori, Mie (JP)

(73) Assignee: Tosoh Corporation, Shunan (JP)

( * ) Notice: Subject to any disclaimer, the term of this patent is extended or adjusted under 35 U.S.C. 154(b) by 0 days.

(21) Appl. No.: 10/956,088

(22) Filed: Oct. 4, 2004

(65) Prior Publication Data

US 2005/0090639 A1    Apr. 28, 2005

(30) Foreign Application Priority Data

Oct. 24, 2003  (JP)  ............................. 2003-364290
Nov. 5, 2003   (JP)  ............................. 2003-375508
Jul. 27, 2004  (JP)  ............................. 2004-218645

(51) Int. Cl.
*C08G 63/08*   (2006.01)
*C08G 69/44*   (2006.01)

(52) U.S. Cl. ..................................... 528/183; 528/210
(58) Field of Classification Search ................ 528/183, 528/210
See application file for complete search history.

(56) References Cited

U.S. PATENT DOCUMENTS 5,760,143 A * 6/1998 Kubo et al. ................. 525/425
5,811,495 A * 9/1998 Kirikihira et al. .......... 525/434

FOREIGN PATENT DOCUMENTS

EP   1 088 845 A2   4/2001

* cited by examiner

*Primary Examiner*—Jeffrey Mullis
(74) *Attorney, Agent, or Firm*—Oblon, Spivak, McClelland, Maier & Neustadt, P.C.

(57) ABSTRACT

An aromatic amide block copolymer containing a specific aromatic amide compound unit and having a weight average molecular weight, as reduced into standard polystyrene measured by the gel permeation chromatography, of from 10,000 to 1,000,000.

13 Claims, No Drawings

AROMATIC AMIDE BLOCK COPOLYMER AND PROCESS OF PRODUCING THE SAME

FIELD OF THE INVENTION

The present invention relates to an aromatic amide block copolymer having properties as a thermoplastic elastomer and having excellent heat aging characteristics and mechanical characteristics, in particular, an aromatic amide block copolymer which is suited for various molding materials such as fibers, films, sheets, boots, gears, tubes, packing, and wire coatings and to a process of producing the same.

BACKGROUND OF THE INVENTION

In recent years, the substitution of crosslinked rubbers by a thermoplastic elastomer advances from the viewpoints of recycle properties and energy conservation properties. Thermoplastic elastomers are constructed of a soft segment that is rich in rubber elasticity and a hard segment which will become a constraint phase of a molecular chain, and various thermoplastic elastomers using various combinations of a hard segment and a soft segment have been developed and put into the market. Above all, polyamide based or polyester based thermoplastic elastomers are broadly used in automobile parts, electric and electronic parts, industrial parts, and so on as a thermoplastic elastomer excellent in heat resistance and oil resistance. A hard segment of polyamide based or polyester based thermoplastic elastomers is constructed of a high-molecular compound having a high melting point, such as 6-nylon, 6,6-nylon, and poly(butylene terephthalate). However, there is a distribution in the hard segment chain length, resulting in problems such that the elasticity is lowered with an increase of the temperature, leading to a lowering of the softening temperature and that the temperature dependency of physical properties is large. Also, with the progress of lightening in the weight and thinning in the wall thickness, the creation of a thermoplastic elastomer having more excellent heat resistance is desired.

For the sake of solving the foregoing problems, a new type of thermoplastic elastomer containing as a hard segment an aromatic oligomer having a high crystallinity and a high melting point and having a uniform chain length are proposed. For example, a thermoplastic elastomer containing 4,4'-dihydroxy-p-quaterphenyl as a hard segment and an aliphatic polyester unit as a soft segment and having a low hardness and excellent heat resistance is proposed (for example, see Patent Document 1).

Also, a thermoplastic elastomer using an aromatic amide ester compound having a high crystallinity and a high melting point as a hard segment and a poly(oxyalkylene) unit as a soft segment is proposed. For example, a thermoplastic elastomer obtained by the melt polycondensation process of an aromatic amide ester compound composed of an aromatic dicarboxylic acid compound and an aromatic diamine compound and a poly(oxyalkylene glycol) (for example, see Patent Document 2); and a thermoplastic elastomer obtained by melt polycondensation of an aromatic amide ester compound composed of an aromatic dicarboxylic acid compound and an aromatic aminocarboxylic acid compound and a poly(oxyalkylene glycol) (for example, see Patent Document 3) are proposed.

Further, a thermoplastic elastomer obtained by the melt polycondensation process of an aromatic amide ester compound and a polyolefin polyol such as a hydroxyl-terminated ethylene/butylene copolymer (for example, see Patent Document 4); a thermoplastic elastomer obtained by polycondensation reaction of a terminal active aromatic amide ester compound and a polyester based polyol or a poly(organosiloxane) based polyol (for example, see Patent Document 5); and process of producing the same are proposed.

[Patent Document 1] JP-A-02-276817
[Patent Document 2] JP-A-06-207006
[Patent Document 3] JP-A-06-207007
[Patent Document 4] JP-A-08-253569
[Patent Document 5] JP-A-08-134210

(The term "JP-A" as used herein means an "unexamined published Japanese patent application".)

However, according to the method proposed in Patent Document 1, since the reaction temperature is very high, the aliphatic polyester as the soft segment is liable to cause heat decomposition or depolymerization. As a result, not only the production of a high-molecular product is difficult, but also the chain length of the soft segment becomes non-uniform, possibly resulting in deterioration of mechanical characteristics.

Though the thermoplastic elastomers obtained by the methods proposed in Patent Documents 2, 3 and 4 had a high melting point and a high softening temperature, they were low in strength and insufficient in long-term heat resistance.

In the thermoplastic elastomer obtained by the method proposed in Patent Document 5, though it is admitted that the long-term heat resistance is improved, the problem that the strength is low is not solved yet. Also, expensive aminobenzoic acid is used in the synthesis of the terminal active aromatic amide compound, and complicated synthesis steps are required, resulting in a problem from the economical standpoint.

SUMMARY OF THE INVENTION

Then, an object of the invention is to solve the forgoing problems and to provide a novel aromatic amide block copolymer having properties as a thermoplastic elastomer that is adaptive to a broad hardness region ranging from a low hardness to a high hardness and is excellent in heat aging resistance and mechanical characteristics and a process of producing the same.

For the sake of solving the foregoing problems, the present inventors made extensive and intensive investigations. As a result, it has been found that an aromatic amide block copolymer using a specific aromatic amide unit in a hard segment is excellent in heat aging resistance and mechanical characteristics, leading to accomplishment of the invention.

Specifically, the invention relates to an aromatic amide block copolymer comprising an aromatic amide compound unit represented by the following general formula (1) and a structural unit represented by the following general formulae (2) and/or (3) and having a weight average molecular weight, as reduced into standard polystyrene measured by the gel permeation chromatography, of from 10,000 to 1,000,000 and to a process of producing the same.

(1)

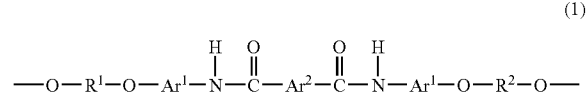

Here, $R^1$ and $R^2$ each independently represents a divalent alkylene group having from 1 to 20 carbon atoms; and $Ar^1$ and $Ar^2$ each independently represents a divalent arylene group having from 6 to 20 carbon atoms.

$$-G^1-X-G^2- \quad (2)$$

$$-X-G^3-X- \quad (3)$$

Here, $G^1$ and $G^2$ each represents a polyester residue; $G^3$ represents a diol compound residue or a polyol compound residue; and X represents at least one chain extending component unit selected from groups represented by the following general formulae (4) to (5).

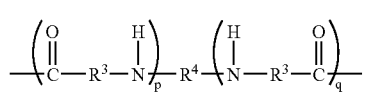

(4)

Here, $R^3$s each independently represents a divalent alkylene group having from 2 to 20 carbon atoms; $R^4$ represents a carbonyl group or a divalent organic group having from 2 to 20 carbon atoms; and p and q each represents 0 or 1.

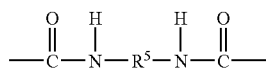

(5)

Here, $R^5$ represents a divalent hydrocarbon group having from 2 to 20 carbon atoms.

DETAILED DESCRIPTION OF THE INVENTION

The invention will be described below in detail.

The aromatic amide block copolymer of the invention is an aromatic amide block copolymer comprising an aromatic amide compound unit represented by the general formula (1) and a structural unit represented by the general formulae (2) and/or (3).

Here, $R^1$ and $R^2$ represented in the general formula (1) each independently represents a divalent alkylene group having from 1 to 20 carbon atoms. The alkylene group may be linear or branched, and examples thereof include unsubstituted alkylene groups (for example, a methylene group, an ethylene group, a trimethylene group, a tetramethylene group, a pentamethylene group, and a hexamethylene group) and these alkylene groups to which one or more alkyl substituents (for example, a methyl group and an ethyl group) or aryl substituents (for example, a phenyl group) are bonded. Of these, an ethylene group, a propylene group, and a trimethylene group are preferable.

In the general formula (1), $Ar^1$ and $Ar^2$ each independently represents a divalent arylene group having from 6 to 20 carbon atoms. Specific examples thereof can be given below.

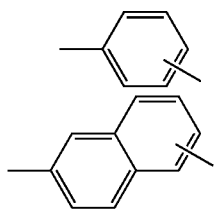
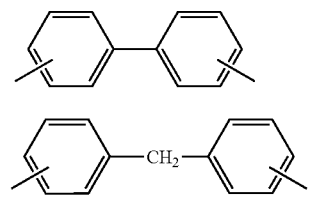
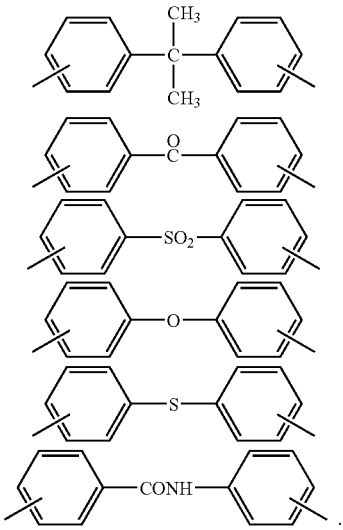

Of these, the following group is preferable because an aromatic amide block copolymer having an excellent balance between the heat aging resistance and the mechanical characteristics can be produced, and a 1,4-phenylene group is especially preferable.

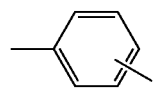

The polyester residue constructing $G^1$ or $G^2$ represented in the general formula (2) is not particularly limited from the structural standpoint, and examples thereof include a polyester residue obtained by polycondensation of a dicarboxylic acid compound and a diol compound and a polylactone residue. Examples of the dicarboxylic acid compound include oxalic acid, malonic acid, succinic acid, glutaric acid, adipic acid, pimelic acid, suberic acid, azelaic acid, sebacic acid, terephthalic acid, and isophthalic acid; and examples of the diol compound include 1,2-ethanediol, 1,2-propanediol, 1,3-propanediol, 1,3-butanediol, 1,4-butanediol, 2,2-dimethylpropane-1,3-diol, 1,5-pentanediol, 1,6-hexanediol, and 1,9-nonanediol. Specific examples of the polyester residue that is obtained by polycondensation of the foregoing dicarboxylic acid compound and the foregoing diol compound include a poly(ethylene adipate) residue, a poly(tetramethylene adipate) residue, and a poly(hexamethylene adipate) residue.

Also, examples of the polylactone residue include a poly(propiolactone) residue, a poly(butyrolactone) reside, a poly(valerolactone) residue, a poly(caprolactone) residue, a poly(methylvalerolactone) residue, a poly(enantolactone) residue, and a poly(caprylolactone) residue.

Of these polyester residues, the polylactone residue is preferable because an aromatic amide block copolymer having excellent heat aging resistance can be obtained. Above all, a poly(caprolactone) residue is especially preferable.

Also, the diol compound residue or polyol compound residue constructing $G^3$ represented in the general formula (3) is not particularly limited from the structural standpoint. Of these, one or more diol compounds residues or polyol compound residues selected from the group consisting of a poly(oxyalkylene) based polyol residue, a poly(organosiloxane) based polyol residue, an aliphatic hydrocarbon based diol residue, an aliphatic hydrocarbon based polyol residue, an alicyclic hydrocarbon based polyol residue, a polyester based polyol residue, a polycarbonate based polyol residue, and a poly(vinyl ether) based polyol residue are preferable because an aromatic amide block copolymer having excellent mechanical characteristics can be obtained. Here, the diol compound residue is a residue derived from a diol compound comprising a compound having two hydroxyl groups at the both terminals thereof; and the polyol compound residue is a residue derived from a polyol compound comprising a polymer having two hydroxyl groups at the both terminals thereof. Incidentally, the polyol compound is not particularly limited with respect to the molecular weight, and any compound can be used. Above all, the number average molecular weight of the polyol compound is preferably in the range of from 300 to 10,000, and especially preferably in the range of from 500 to 5,000 because an aromatic amide block copolymer having excellent easiness of handling can be obtained.

Examples of the poly(oxyalkylene) based polyol residue constructing $G^3$ include poly(oxyalkylene) based polyol residues derived from, for example, poly(oxyethylene), poly(oxypropylene), poly(oxytetramethylene), poly(oxyhexamethylene), a copolymer of ethylene oxide and propylene oxide, a copolymer of ethylene oxide and tetrahydrofuran, or an ethylene oxide addition polymer of poly(propylene oxide).

Also, examples of the poly(organosiloxane) based polyol residue constructing $G^3$ include ones represented by the following general formulae (9) and (10).

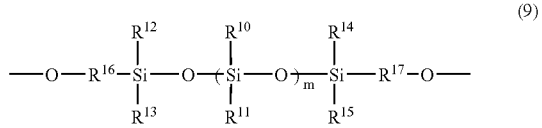

In the formula, $R^{10}$ to $R^{15}$ each represents a substituted or unsubstituted monovalent hydrocarbon group having from 1 to 20 carbon atoms; $R^{16}$ and $R^{17}$ each represents a substituted or unsubstituted divalent hydrocarbon group having from 1 to 20 carbon atoms; and m represents an integer of from 4 to 150.

Here, $R^{10}$ to $R^{15}$ each represents a substituted or unsubstituted monovalent hydrocarbon group having from 1 to 20 carbon atoms and may be the same or different. Examples of the hydrocarbon group include substituted or unsubstituted alkyl groups such as a methyl group, an ethyl group, a propyl group, a 3,3,3-trifluoropropyl group, and a chloropropyl group; substituted or unsubstituted cycloalkyl groups such as a cyclopentyl group and a cyclohexyl group; and substituted or unsubstituted alkenyl groups such as a vinyl group, a propenyl group, a butenyl group, a hexenyl group, and a decenyl group.

$R^{16}$ and $R^{17}$ each represents a substituted or unsubstituted divalent hydrocarbon group having from 1 to 20 carbon atoms and may be the same or different, and the hydrocarbon group may be linear or branched. Examples of the hydrocarbon group include a methylene group, an ethylene group, a trimethylene group, a tetramethylene group, a pentamethylene group, a 2,2-dimethyltrimethylene group, a hexamethylene group, a 2-methylheptamethylene group, a heptamethylene group, an octamethylene group, a nonamethylene group, a decamethylene group, and a 1,4-cyclohexylene group.

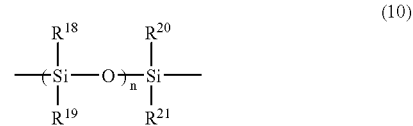

In the formula, $R^{18}$ to $R^{21}$ each represents a substituted or unsubstituted monovalent hydrocarbon group having from 1 to 20 carbon atoms; and n represents an integer of from 4 to 150.

Here, $R^{18}$ to $R^{21}$ each represents a substituted or unsubstituted monovalent hydrocarbon group having from 1 to 20 carbon atoms and may be the same or different. Examples of the hydrocarbon group include substituted or unsubstituted alkyl groups such as a methyl group, an ethyl group, a propyl group, a 3,3,3-trifluoropropyl group, and a chloropropyl group; substituted or unsubstituted cycloalkyl groups such as a cyclopentyl group and a cyclohexyl group; and substituted or unsubstituted alkenyl groups such as a vinyl group, a propenyl group, a butenyl group, a hexenyl group, and a decenyl group.

Also, examples of the aliphatic hydrocarbon based diol residue constructing $G^3$ include aliphatic hydrocarbon based diol residues such as a 1,2-ethanediol residue, a 1,2-propanediol residue, a 1,3-propanediol residue, a 1,3-butanediol residue, a 1,4-butanediol residue, a 2,2-dimethylpropane-1,3-diol residue, a 1,5-pentanediol residue, a 1,6-hexanediol residue, and a 1,9-nonanediol residue.

Examples of the aliphatic hydrocarbon based polyol residue constructing $G^3$ include polyolefin residues derived from polyolefins having a hydroxyl group at the both terminals thereof resulting from hydroxylation of the both terminals of a homopolymer, a random copolymer, an alternating copolymer, or a block copolymer of an olefin such as ethylene, propylene, and isobutylene; poly(diene) residues derived from poly(diene)s having a hydroxyl group at the both terminals thereof resulting from hydroxylation of the both terminals of a conjugated diene based hydrocarbon such as butadiene and isoprene; and aliphatic hydrocarbon based polyol residues such as hydrogenated poly(diene) residues derived from hydrogenated poly(diene)s having a hydroxyl group at the both terminals thereof resulting from hydrogenation of a double bond of the foregoing poly(diene).

Also, examples of the alicyclic hydrocarbon based polyol residue constructing $G^3$ include ones represented by the following general formula (11).

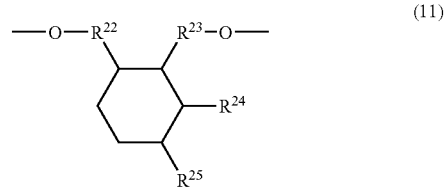

In the formula, $R^{22}$ and $R^{23}$ each represents an alkylene group; $R^{24}$ and $R^{25}$ each represents an alkyl group; and the total sum of carbon atoms of $R^{22}$ to $R^{25}$ is from 22 to 34.

Examples of the alicyclic hydrocarbon based polyol residue include alicyclic hydrocarbon based polyol residues derived from hydrogenated dimer diols obtained by dimerization and hydrogenation of an unsaturated fatty acid such as linolic acid, linoleic acid, and oleic acid. Above all, alicyclic hydrocarbon based polyol residues derived from hydrogenated dimer diols having a total sum of carbon atoms of $R^{22}$ to $R^{25}$ of 28 are preferable because they are easily available.

Also, the polyester based polyol residue constructing $G^3$ is not particularly limited from the structural standpoint, and examples thereof include polyester based polyol residues obtained by polycondensation of a dicarboxylic acid compound and an aliphatic diol compound and polylactone based polyol residues. Examples of the foregoing dicarboxylic acid compound include oxalic acid, malonic acid, succinic acid, glutaric acid, adipic acid, pimelic acid, suberic acid, azelaic acid, sebacic acid, terephthalic acid, and isophthalic acid; and examples of the foregoing aliphatic diol compound include 1,2-ethanediol, 1,2-propanediol, 1,3-propanediol, 1,3-butanediol, 1,4-butanediol, 2,2-dimethylpropane-1,3-diol, 1,5-pentanediol, 1,6-hexanediol, and 1,9-nonanediol. Specific examples of the polyester based polyol residue that is obtained by polycondensation of the foregoing dicarboxylic acid compound and the foregoing diol compound include polyester based polyol residues derived from, for example, poly(ethylene adipate), poly(tetramethylene adipate), or poly(hexamethylene adipate).

Also, examples of the polylactone based polyol residue include polylactone based polyol residues derived from, for example, poly(propiolactone), poly(butyrolactone), poly(valerolactone), poly(caprolactone), poly(methylvalerolactone), poly(enantolactone), or poly(caprylolactone).

The polycarbonate based polyol residue constructing $G^3$ is not particularly limited from the structural standpoint, and examples thereof include polycarbonate based polyol residues obtained by reacting the foregoing aliphatic diol compound and a carbonic ester or phosgene. Specific examples thereof include polycarbonate based polyol residues derived from, for example, poly(propylene carbonate), poly(tetramethylene carbonate), poly(hexamethylene carbonate), poly(3-methyl-pentamethylene carbonate), poly(nonanemethylene carbonate), poly(nonanediol/methyloctanediol carbonate), or poly(3-methyl-1,5-pentanediol/1,6-hexanediol carbonate).

Also, the poly(vinyl ether) based polyol residue constructing $G^3$ is not particularly limited so far as it has a vinyl ether as a repeating unit. Examples thereof include poly(vinyl ether) based polyol residues derived from poly(alkyl vinyl ether)s such as poly(methyl vinyl ether), poly(ethyl vinyl ether), poly(propyl vinyl ether), poly(butyl vinyl ether), poly(isobutyl vinyl ether), and poly(t-butyl vinyl ether); and poly(vinyl ether) based polyol residues derived from poly(vinyl ether)s having a saturated ester group, an unsaturated ester group, an oxyethylene group, an imide group, a siloxy group, etc. Of these, poly(vinyl ether) based polyol residues derived from poly(alkyl vinyl ether)s are preferable because an aromatic amide block copolymer having excellent mechanical characteristics can be obtained.

X in the general formulae (2) and (3) represents at least one chain extending component unit selected from groups represented by the general formulae (4) to (5).

$R^3$s in the chain extending component unit represented by the general formula (4) each independently represents a divalent alkylene group having from 2 to 20 carbon atoms, which may be linear or branched. Examples of the alkylene group include an ethylene group, a trimethylene group, a tetramethylene group, a pentamethylene group, a 2,2-dimethyltrimethylene group, a hexamethylene group, 2-methylheptamethylene group, heptamethylene group, an octamethylene group, a nonamethylene group, a decamethylene group, and an undecamethylene group. Of these, a pentamethylene group is preferable because it is easily available.

Also, in the general formula (4), $R^4$ represents a carbonyl group or a divalent organic group having from 2 to 20 carbon atoms. Examples of the organic group include a dicarboxylic acid residue, a tetracarboxylic acid anhydride residue, and a diglycidyl compound residue. Examples of the dicarboxylic acid residue include aliphatic dicarboxylic acid residues derived from a malonyl group, a succinyl group, a glutaryl group, an adipoyl group, a pimeloyl group, a suberoyl group, an azelaoyl group, a sebacoyl group, etc.; and arylenedicarboxylic acid resides derived from a phthaloyl group, an isophthaloyl group, a terephthaloyl group, a 2,6-naphthalenedicarbonyl group, a 1,5-naphthalenedicarbonyl group, a 2,7-naphthalenedicarbonyl group, a 4,4'-biphenylenedicarbonyl group, etc. Examples of the tetracarboxylic acid anhydride residue include a pyromellitic dianhydride residue, 1,4,5,8-naphthalenetetracarboxylic acid dianhydride residue, a 3,3',4,4'-benzophenonetetracarboxylic acid dianhydride residue, a 3,3',4,4'-biphenyltetracarboxylic acid dianhydride residue, a bis(3,4-dicarboxyphenyl) ether dianhydride residue, a bis(3,4-dicarboxyphenyl) sulfone dianhydride residue, a bis(3,4-dicarboxyphenyl) sulfide dianhydride residue, a 2,2-bis(3,4-dicarboxyphenyl)hexafluoropropane dianhydride residue, and a 1,2,3,4-tetracarboxybutane dianhydride residue. Examples of the diglycidyl compound reside include diglycidyl ester compound residues of a dicarboxylic acid such as a diglycidyl terephthalate residue; and diglycidyl ether compound residues derived from p-phenylenediglycidyl ether, etc. Of these, $R^4$ is preferably a carbonyl group or a dicarboxylic acid residue because an aromatic amide block copolymer having especially excellent mechanical characteristics can be obtained. In particular, dicarboxylic acid residues derived from an adipoyl group, an isophthaloyl group, and a terephthaloyl group are preferable.

In the general formula (4), p and q each represents 0 or 1. In the case where p=0 and q=0, specific examples of the general formula (4) include a carbonyl group and a divalent organic group having from 2 to 20 carbon atoms the same as in foregoing $R^4$. In the case of p=1 and q=1, specific examples of the general formula (4) include residues derived from compounds resulting from ring opening of two caprolactams of an acyllactam compound such as N,N'-terephthaloylbiscaprolactam, N,N'-isophthaloylbiscaprolactam, N,N'-adipoylbiscaprolactam, N,N'-succinylbiscaprolactam, and N,N'-carbonylbiscaprolactam. In the case of p=1 and q=0, or p=0 and q=1, specific examples of the general formula (4) include residues derived from compounds resulting from ring opening of only one of the two caprolactams of the foregoing acyllactam compound.

$R^5$ in the chain extending component unit represented by the general formula (5) represents a divalent hydrocarbon group having from 2 to 20 carbon atoms. Examples of the hydrocarbon group include alkylene groups such as an ethylene group, a trimethylene group, a tetramethylene group, a pentamethylene group, a 2,2-dimethyltrimethylene group, a hexamethylene group, a 2-methylheptamethylene group, a heptamethylene group, an octamethylene group, a nonamethylene group, and a decamethylene group; arylene groups such as a 1,2-phenylene group, a 1,3-phenylene group, a 1,4-phenylene group, a 2,6-naphthylene group, a 1,5-naphthylene group, a 2,7-naphthylene group, and a biphenylene group; alkyl-substituted bodies of these arylene groups such as a xylylene group; and substituents in which a methylene group or an alkylene group and an arylene group are bonded to each other, such as a 4,4'-diphenylmethane group. Of these, a 4,4'-diphenylmethane group, a 1,2-phenylene group, a 1,3-phenylene group, a 1,4-phenylene group, a xylylene group, a hexamethylene group, and methyl-substituted bodies of these groups are preferable because an aromatic amide block copolymer having especially excellent heat aging resistance can be obtained.

Also, specific examples of the chain extending component unit represented by the general formula (5) include alkylenedicarbamoyl groups such as a 1,2-ethanedicarbamoyl group, a 1,3-propanedicarbamoyl group, a 1,4-butanedicarbamoyl group, a 1,5-pentanedicarbamoyl group, a 1,6-hexanedicarbamoyl group, a 1,7-heptanedicarbamoyl group, a 1,8-octanedicarbamoyl group, a 1,9-nonanedicarbamoyl group, and a 1,10-decanedicarbamoyl group; arylenedicarbamoyl groups such as a 1,2-phenyldicarbamoyl group, a 1,3-phenyldicarbamoyl group, a 1,4-phenyldicarbamoyl group, a 2,6-naphthalenedicarbamoyl group, a 1,5-naphthalenedicarbamoyl group, and a 2,7-naphthalenedicarbamoyl group; alkyl-substituted bodies of these arylenedicarbamoyl groups such as a xylylenedicarbamoyl group; and substituents in which a methylene group or an alkylene group and an arylene group are bonded to each other such as a diphenylmethane-4,4'-dicarbamoyl group. Of these, a diphenylmethane-4,4'-dicarbamoyl group, a 1,2-phenyldicarbamoyl group, a 1,3-phenyldicarbamoyl group, a 1,4-phenyldicarbamoyl group, a xylylenedicarbamoyl group, a 1,6-hexanedicarbamoyl group, and methyl-substituted bodies of these groups are preferable because an aromatic amide block copolymer having especially excellent heat aging resistance can be obtained.

As the production process of the aromatic amide block copolymer of the invention, any process may be employed so far as the aromatic amide block copolymer can be produced. For example, the aromatic amide block copolymer can be produced by reacting a polylactone obtained by heat ring-opening polymerization of a lactone compound represented by the following general formula (7) in the presence of a dihydroxy aromatic amide compound represented by the following general formula (6), and a chain extending agent.

(6)

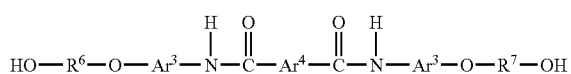

In the formula, $R^6$ and $R^7$ each independently represents a divalent alkylene group having from 1 to 20 carbon atoms; and $Ar^3$ and $Ar^4$ each independently represents a divalent arylene group having from 6 to 20 carbon atoms.

(7)

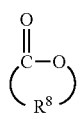

In the formula, $R^8$ represents a divalent aliphatic hydrocarbon group having 2 to 20 carbon atoms.

$R^6$ and $R^7$ constructing the dihydroxy aromatic amide compound represented by the foregoing general formula (6) each independently represents a divalent alkylene group having from 1 to 20 carbon atoms. The alkylene group may be linear or branched, and examples thereof include unsubstituted alkylene groups such as an ethylene group, a trimethylene group, a tetramethylene group, a pentamethylene group, and a hexamethylene group; and substituted bodies of these alkylene groups in which one or more alkyl substituents (for example, a methyl group and an ethyl group) or aryl substituents (for example, a phenyl group) are bonded. Of these, an ethylene group, a propylene group, and a trimethylene group are preferable.

In the general formula (6), $Ar^3$ and $Ar^4$ each independently represents a divalent arylene group having from 6 to 20 carbon atoms. Specific examples thereof can be given below.

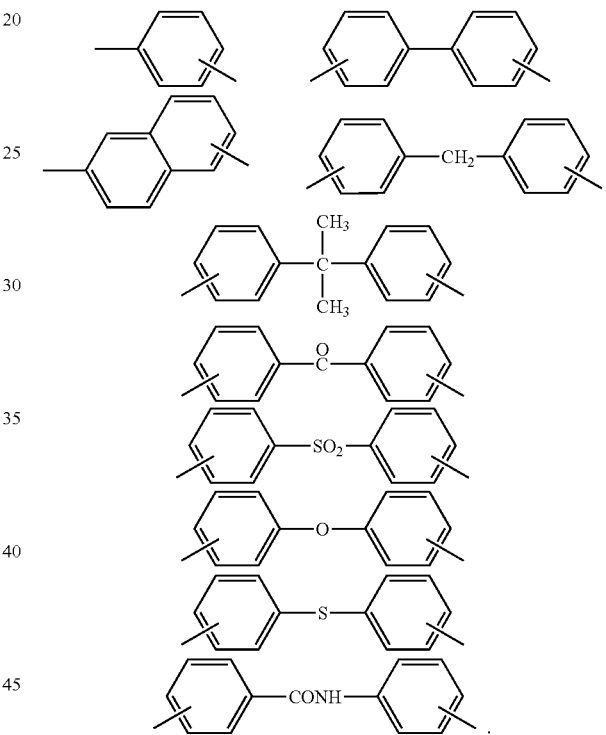

Of these, the following group is preferable because an aromatic amide block copolymer having an excellent balance between the heat aging resistance and the mechanical characteristics can be produced, and a 1,4-phenylene group is especially preferable.

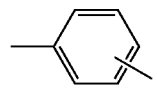

Examples of the dihydroxy aromatic amide compound represented by the general formula (6) include N,N'-bis(4-(2-hydroxyethoxy)phenyl)-1,4-benzenedicarboxamide, N,N'-bis(3-(2-hydroxyethoxy)phenyl)-1,4-benzenedicarboxamide, N,N'-bis(2-(2-hydroxyethoxy)phenyl)-1,4-benzenedicarboxamide, N,N'-bis(4-(2-hydroxyethoxy)phenyl)-1,3-benzenedicarboxamide, N,N'-bis(3-(2-hydroxyethoxy)

phenyl)-1,3-benzenedicarboxamide, N,N'-bis(2-(2-hydroxyethoxy)phenyl)-1,3-benzenedicarboxamide, N,N'-bis(4-(2-hydroxy-1-methylethoxy)phenyl)-1,4-benzenedicarboxamide, N,N'-bis(3-(2-hydroxy-1-methylethoxy)phenyl)-1,4-benzenedicarboxamide, N,N'-bis(2-(2-hydroxy-1-methylethoxy)phenyl)-1,4-benzenedicarboxamide, N,N'-bis(4-(2-hydroxy-1-methylethoxy)phenyl)-1,3-benzenedicarboxamide, N,N'-bis(3-(2-hydroxy-1-methylethoxy)phenyl)-1,3-benzenedicarboxamide, N,N'-bis(2-(2-hydroxy-1-methylethoxy)phenyl)-1,3-benzenedicarboxamide, N,N'-bis(4-(2-hydroxypropoxy)phenyl)-1,4-benzenedicarboxamide, N,N'-bis(3-(2-hydroxypropoxy)phenyl)-1,4-benzenedicarboxamide, N,N'-bis(2-(2-hydroxypropoxy)phenyl)-1,4-benzenedicarboxamide, N,N'-bis(4-(2-hydroxypropoxy)phenyl)-1,3-benzenedicarboxamide, N,N'-bis(3-(2-hydroxypropoxy)phenyl)-1,3-benzenedicarboxamide, and N,N'-bis(2-(2-hydroxypropoxy)phenyl)-1,3-benzenedicarboxamide. Of these, N,N'-bis(4-(2-hydroxyethoxy)phenyl)-1,4-benzenedicarboxamide, N,N'-bis(4-(2-hydroxypropoxy)phenyl)-1,4-benzenedicarboxamide, and N,N'-bis(4-(2-hydroxy-1-methylethoxy)phenyl)-1,4-benzenedicarboxamide are preferable because an aromatic amide block copolymer having excellent mechanical characteristics can be obtained. The dihydroxy aromatic amide compound can be, for example, produced by reacting an aromatic amide compound having a phenolic hydroxyl group at the both terminals thereof and a cyclic carbonate such as ethylene carbonate at from 150 to 200° C.

$R^8$ constructing the lactone compound represented by the general formula (7) represents a divalent aliphatic hydrocarbon group having 2 to 20 carbon atoms, and the aliphatic hydrocarbon group may be linear or branched. Examples thereof include alkylene groups (for example, an ethylene group, a trimethylene group, a tetramethylene group, a pentamethylene group, a hexamethylene group, a heptamethylene group, and an octamethylene group) and these alkylene groups to which one or more alkyl substituents (for example, a methyl group) are bonded. Of these, a pentamethylene group is preferable. Examples of the lactone compound include β-propiolactone, γ-butyrolactone, δ-valerolactone, ε-caprolactone, ζ-enantolactone, η-caprylolactone, and these lactone compounds to which one or more alkyl substituents (for example, a methyl group) are bonded. Of these, ε-caprolactone is preferable. These lactone compounds may be used singly or in combinations of two or more thereof.

Here, the proportion of the dihydroxy aromatic amide compound to the lactone compound to be used can be properly chosen. The molar ratio of the dihydroxy aromatic amide compound to the lactone compound is preferably from 1/1 to 1/5,000, more preferably from 1/2 to 1/100, and especially preferably from 1/4 to 1/50.

Also, the ring-opening polymerization of the lactone compound in the presence of the dihydroxy aromatic amide compound can be carried out merely by heat ring-opening polymerization. However, for the sake of more promoting the reaction efficiency, it is preferred to use a ring-opening polymerization catalyst. As the ring-opening polymerization catalyst, ones which are generally used for ring-opening polymerization reaction of a lactone compound can be used. Examples thereof include compounds such as inorganic bases, inorganic acids, alkali metal catalysts, alkaline earth metals, and lanthanoides. Specific examples thereof include oxides of metals (for example, lithium, sodium, potassium, rubidium, cesium, magnesium, calcium, barium, strontium, zinc, aluminum, titanium, zirconium, cobalt, germanium, tin, lead, antimony, arsenic, cerium, boron, cadmium, manganese, tungsten, and molybdenum); organometallic compounds containing these metals; organic acid salts of these metals; halide compounds of these metals; and alkoxides of these metals. In particular, organotin compounds and organotitanium compounds are preferable because they are a ring-opening polymerization catalyst having low toxicity and having an excellent balance among reactivity, non-coloring properties and stability resistance.

Specific examples of the organotin compound include tin tetraacetate, monobutyltin hydroxide oxide, monobutyltin tris(2-ethyl hexanoate), dibutyltin oxide, dibutyltin dilaurate, and tin dioctanoate. Also, specific examples of the organotitanium compound include tetrabutyl titanate, tetrapropyl titanate, and tetraethyl titanate. Of these, dibutyltin dilaurate, monobutyltin tris(2-ethyl hexanoate), and tetrabutyl titanate are preferable because the lactone compound can be subjected to ring-opening polymerization with good efficiency. These ring-opening polymerization catalysts can be used singly or in combinations of two or more thereof.

With respect to the amount of the ring-opening polymerization catalyst to be used, any amount may be employed so far as the lactone compound can be subjected to ring-opening polymerization. Above all, the amount of the ring-opening polymerization catalyst to be used is preferably from 0.0001 to 0.2% by weight, and especially preferably from 0.0005 to 0.10% by weight based on the total amount of the dihydroxy aromatic amide compound and the lactone compound because the reaction efficiently is especially excellent.

Also, in carrying out the ring-opening polymerization reaction, the reaction temperature and the reaction time can be arbitrarily chosen. The reaction temperature is preferably in the range of from 50 to 250° C., more preferably from 100 to 220° C., and especially preferably from 150 to 200° C. because the reaction efficiency is excellent.

The ring-opening polymerization reaction can be, for example, carried out in an inert gas atmosphere such as nitrogen, helium, argon, and methane. Also, the ring-opening polymerization reaction can be carried out in a solvent. Examples of the solvent which can be used include aromatic hydrocarbons such as toluene and xylene; aliphatic or alicyclic hydrocarbons such as hexane and cyclohexane; and aprotic polar solvents such as N-methyl-2-pyrrolidone, 1,3-dimethyl-2-imidazolidinone, dimethyl sulfoxide, dimethylacetamide, dimethylformamide, tetramethyl phosphotriamide, and sulforane. Of these, aprotic polar solvents that are rich in solubility to the dihydroxy aromatic amide compound are preferable.

It is possible to obtain an aromatic amide block copolymer by reacting a polylactone obtained by the foregoing method and a chain extending agent.

As the chain extending agent that reacts with a polylactone obtained by heat ring-opening polymerization of the dihydroxy aromatic amide compound represented by the general formula (6) and the lactone compound represented by the general formula (7), any compound having a functional group capable of reacting with the hydroxyl groups present at the both terminals of the polylactone and capable of connecting a plurality of the polylactone to form an aromatic amide block copolymer may be used. Examples of such a compound include bifunctional acid halide compounds, bifunctional isocyanate compounds, bifunctional carbonate compounds, bifunctional ester compounds, bifunctional acyllactam compounds, bifunctional epoxy compounds, and bifunctional aromatic tetracarboxylic acid anhydrides. The chain extending agent may be used singly or in combinations of two or more thereof. In particular, bifunctional acid halide compounds, bifunctional isocyanate compounds, bifunctional carbonate compounds, bifunctional ester compounds, and bifunctional acyllactam compounds are preferable as the chain extending agent because they are excellent in reactivity with the polylactone, and an aromatic amide block copolymer can be obtained with good efficiency. Above all, bifunctional acyllactam compounds are especially preferable because an aromatic amide block copolymer having a high molecular weight can be obtained under melt reaction.

Examples of the bifunctional acid halide compounds include bifunctional acid chlorides such as oxalyl chloride, malonyl chloride, succinyl chloride, glutaryl chloride, adipoyl chloride, pimeloyl chloride, suberoyl chloride, azelaoyl chloride, sebacoyl chloride, dodecanoyl chloride, terephthaloyl chloride, isophthaloyl chloride, and phthaloyl chloride; and bifunctional acid bromides such as oxalyl bromide, malonyl bromide, succinyl bromide, glutaryl bromide, adipoyl bromide, pimeloyl bromide, suberoyl bromide, azelaoyl bromide, sebacoyl bromide, dodecanoyl bromide, terephthaloyl bromide, isophthaloyl bromide, and phthaloyl bromide. Of these, adipoyl chloride, terephthaloyl chloride, and isophthaloyl chloride are preferable because they are excellent in reactivity with the polylactone, and an aromatic amide block copolymer can be obtained with good efficiency. Further, these bifunctional acid halide compounds may be used singly or in combinations of two or more thereof.

Examples of the bifunctional isocyanate compounds include diphenylmethane-4,4'-diisocyanate, toluene diisocyanate, phenylene diisocyanate, xylene diisocyanate, xylylene diisocyanate, tetramethylxylene diisocyanate, hexamethylene diisocyanate, isophorone diisocyanate, naphthalene diisocyanate, 2,2,4-trimethylhexamethylene diisocyanate, 2,4,4-trimethylhexamethylene diisocyanate, dimer acid diisocyanate, dicyclohexylmethane diisocyanate, methylcyclohexane diisocyanate, and norbornene diisocyanate. In particular, diphenylmethane-4,4,-diisocyanate, toluene diisocyanate, hexamethylene diisocyanate, dicyclohexylmethane diisocyanate, and isophorone diisocyanate are preferable because they are excellent in reactivity with the polylactone, and an aromatic amide block copolymer can be obtained with good efficiency. Further, these bifunctional isocyanate compounds may be used singly or in combinations of two or more thereof.

Examples of the bifunctional carbonate compounds include dimethyl carbonate, diethyl carbonate, dipropyl carbonate, dibutyl carbonate, and diphenyl carbonate. Of these, diphenyl carbonate is preferable because it is especially excellent in reactivity with the polylactone, and an aromatic amide block copolymer can be obtained with good efficiency. Further, these bifunctional carbonate compounds may be used singly or in combinations of two or more thereof.

Examples of the bifunctional ester compounds include diphenyl adipate, dimethyl adipate, diphenyl terephthalate, diphenyl isophthalate, diphenyl phthalate, diphenyl 2,6-naphthalenedicarboxylate, diphenyl 2,7-naphthalenedicarboxylate, diphenyl 4,4-biphenyldicarboxylate, dimethyl terephthalate, dimethyl isophthalate, dimethyl phthalate, dimethyl 2,6-naphthalenedicarboxylate, dimethyl 2,7-naphthalenedicarboxylate, dimethyl 4,4-biphenyldicarboxylate, diethyl terephthalate, diethyl isophthalate, diethyl phthalate, diethyl 2,6-naphthalenedicarboxylate, diethyl 2,7-naphthalenedicarboxylate, and diethyl 4,4-biphenyldicarboxylate. Of these, diphenyl terephthalate, dimethyl terephthalate, diphenyl isophthalate, dimethyl isophthalate, diphenyl adipate, and dimethyl adipate are preferable because they are especially excellent in reactivity with the polylactone, and an aromatic amide block copolymer can be obtained with good efficiency. Further, these bifunctional ester compounds may be used singly or in combinations of two or more thereof.

Examples of the bifunctional acyllactam compounds include N,N'-terephthaloylbiscaprolactam, N,N'-isophthaloylbiscaprolactam, N,N'-sebacoylbiscaprolactam, N,N'-adipoylbiscaprolactam, N,N'-succinylbiscaprolactam, N,N'-carbonylbiscaprolactam, N,N'-terephthaloylbispyrrolidone, N,N'-isophthaloylbispyrrolidone, N,N'-sebacoylbispyrrolidone, N,N'-adipoylbispyrrolidone, N,N'-succinylbispyrrolidone, N,N'-carbonylbispyrrolidone, N,N'-terephthaloylbislaurolactam, N,N'-isophthaloylbislaurolactam, N,N'-sebacoylbislaurolactam, N,N'-adipoylbislaurolactam, N,N'-succinylbislaurolactam, and N,N'-carbonylbislaurolactam. Of these, N,N'-terephthaloylbiscaprolactam, N,N'-isophthaloylbiscaprolactam, and N,N'-carbonylbiscaprolactam are preferable because they are especially excellent in reactivity with the polylactone, and an aromatic amide block copolymer can be obtained with good efficiency. Further, these bifunctional acyllactam compounds may be used singly or in combinations of two or more thereof.

Examples of the bifunctional epoxy compound include aromatic dicarboxylic acid glycidyl esters such as diglycidyl terephthalate, diglycidyl isophthalate, and diglycidyl phthalate; aromatic diglycidyl ethers such as p-phenylene diglycidyl ether; aliphatic dicarboxylic acid diglycidyl esters such as diethylene glycol diglycidyl ester; and aliphatic dicarboxylic acid diglycidyl ethers such as diethylene glycol diglycidyl ether. Further, these bifunctional epoxy compounds may be used singly or in combinations of two or more thereof.

Examples of the bifunctional aromatic tetracarboxylic acid anhydrides include pyromellitic dianhydride, 1,4,5,8-naphthalenetetracarboxylic acid dianhydride, 3,3',4,4'-benzophenonetetracarboxylic acid dianhydride, 3,3',4,4'-biphenyltetracarboxylic acid dianhydride, bis(3,4-dicarboxyphenyl) ether dianhydride, bis(3,4-dicarboxyphenyl) sulfone dianhydride, bis(3,4-dicarboxyphenyl) sulfide dianhydride, 2,2-bis(3,4-dicarboxyphenyl)hexafluoropropane dianhydride, and 1,2,3,4-tetracarboxybutane dianhydride. Further, these bifunctional aromatic tetracarboxylic acid anhydrides may be used singly or in combinations of two or more thereof.

With respect to the addition timing of the foregoing chain extending agent, the chain extending agent may be added at any timing so far as an aromatic amide block copolymer is obtained. There are numerated a method in which the lactone compound is subjected to heat ring-opening polymerization in the presence of the dihydroxy aromatic amide compound to obtain a polylactone, and immediately thereafter, the chain extending agent is added thereto; a method in which the lactone compound is subjected to heat ring-opening polymerization in the presence of the dihydroxy aromatic amide compound to obtain a polylactone, the unreacted lactone compound and the solvent used at the time of the heat ring-opening polymerization, etc. are removed, and the polylactone is isolated, to which is then added the chain extending agent; and a method in which in obtaining a polylactone by carrying out heat ring-opening polymerization of the lactone compound in the presence of the dihydroxy aromatic amide compound, the chain extending agent is made present, thereby simultaneously carrying out chain extension.

Also, the addition amount of the chain extending agent is not particularly limited and may be properly chosen depending upon the kind and reactivity of the chain extending agent to be used. For example, the chain extending agent may be used in an amount of from about an equimolar amount to a 1.5-fold molar amount based on the mole number of the dihydroxy aromatic amide compound.

The reaction conditions of the dihydroxy aromatic amide compound, the lactone compound, and the chain extending agent are not particularly limited, and the reaction is usually carried out at from room temperature to 250° C. for from 5 minutes to 100 hours. Also, in adding the chain extending agent after heat ring-opening polymerization of the lactone compound in the presence of the dihydroxy aromatic amide compound to obtain a polylactone, the ring-opening polymerization catalyst to be used may be partially or completely deactivated in advance. For example, the deactivation can be carried out by adding a phosphorus compound such as phosphorous acid, phosphoric acid, triphenyl phosphate, phosphoric acid tristriethylene glycol, orthophosphoric acid, carbethoxymethyldiethyl phosphonate, triphenyl phosphite, trimethyl phosphate, and trimethyl phosphite.

Also, with respect to the production process of the aromatic amide block copolymer of the invention, for example, the aromatic amide block copolymer can be produced by reacting the dihydroxy aromatic amide compound represented by the general formula (6) and a diol compound or a polyol compound represented by the following general formula (8) and the chain extending agent.

$$HO\text{—}R^9\text{—}OH \qquad (8)$$

In the formula, $R^9$ represents at least one divalent organic group selected from the group consisting of a poly(oxyalkylene), a poly(organosiloxane), an aliphatic hydrocarbon group, an alicyclic hydrocarbon group, a polyester, a polycarbonate, and a poly(vinyl ether).

The diol compound or polyol compound represented by the foregoing general formula (8) is a compound having a hydroxyl group at the both terminals thereof. As $R^9$, ones having the same structures as in the foregoing $G^3$ can be enumerated. Specific examples of the diol compound or polyol compound include aliphatic hydrocarbon based diols such as 1,2-ethanediol, 1,2-propanediol, 1,3-propanediol, 1,3-butanediol, 1,4-butanediol, 2,2-dimethylpropane-1,3-diol, 1,5-pentanediol, 1,6-hexanediol, and 1,9-nonanediol; poly(oxyalkylene) based polyols such as poly(oxyethylene) polyol, poly(oxypropylene) polyol, poly(oxytetramethylene) polyol, poly(oxyhexamethylene) polyol, a copolymer of ethylene oxide and propylene oxide having a hydroxyl group at the both terminals thereof, a copolymer of ethylene oxide and tetrahydrofuran having a hydroxyl group at the both terminals thereof, and an ethylene oxide-addition polymer of poly(propylene oxide) having a hydroxyl group at the both terminals; poly(organosiloxane) based polyols having a hydroxyl group at the both terminals thereof such as poly(dimethylsiloxane) and poly(diethylsiloxane); dihydroxy polyolefins resulting from hydroxylation of the both terminals of a homopolymer, a random copolymer, an alternating copolymer, or a block copolymer of an olefin such as ethylene, propylene, and isobutylene; dihydroxy poly(diene)s resulting from hydroxylation of the both terminals of a conjugated diene based hydrocarbon such as butadiene and isoprene; dihydroxy hydrogenated poly(diene)s resulting from hydrogenation of the double bond of each of the foregoing poly(diene)s; hydrogenated dimer diols obtained by dimerization and hydrogenation of an unsaturated fatty acid such as linolic acid, linoleic acid, and oleic acid; polylactone based polyols having a hydroxyl group at the both terminals thereof such as poly(propiolactone), poly(butyrolactone), poly(valerolactone), poly(caprolactone), poly(methylvalerolactone), poly(enantolactone), and poly(caprylolactone); polyester based polyols having a hydroxyl group at the both terminals thereof such as poly(ethylene adipate), poly(tetramethylene adipate), and poly(hexamethylene adipate); polycarbonate based polyols having a hydroxyl group at the both terminals thereof such as poly(propylene carbonate), poly(tetramethylene carbonate) poly(hexamethylene carbonate), and poly(nonanemethylene carbonate); and poly(vinyl ether) based polyols having a hydroxyl group at the both terminals thereof such as poly(methyl vinyl ether), poly(ethyl vinyl ether), poly(propyl vinyl ether), poly(butyl vinyl ether), poly(isobutyl vinyl ether), and poly(t-butyl vinyl ether). These diol compounds or polyol compounds may be used singly or in admixture of two or more thereof.

In reacting the dihydroxy aromatic amide compound, the diol compound or polyol compound, and the chain extending agent, the molar ratio of the dihydroxy aromatic amide compound to the diol compound or polyol compound is not particularly limited. The molar ratio of the dihydroxy aromatic amide compound to the diol compound or polyol compound is preferably from 2/1 to 1/25. Also, with respect to the chain extending agent, any compound can be used so far as it has a functional group capable of reacting with the dihydroxy aromatic amide compound and the hydroxyl groups present at the both terminals of the diol compound or polyol compound and can form the aromatic amide block copolymer of the invention. Examples of the chain extending agent include the foregoing bifunctional acid halide compounds, bifunctional isocyanate compounds, bifunctional carbonate compounds, bifunctional ester compounds, bifunctional acyllactam compounds, bifunctional epoxy compounds, and bifunctional aromatic tetracarboxylic acid anhydrides. These chain extending agents may be used singly or in combinations of two or more thereof. Of these, bifunctional acid halide compounds, bifunctional isocyanate compounds, bifunctional carbonate compounds, bifunctional ester compounds, and bifunctional acyllactam compounds are preferable because they are especially excellent in reactivity, and an aromatic amide block copolymer can be obtained with good efficiency.

With respect to the addition timing of the foregoing chain extending agent, the chain extending agent may be added at any timing so far as an aromatic amide block copolymer is obtained. There is enumerated a method in which the dihydroxy aromatic amide compound and the diol compound or polyol compound are polymerized in the co-presence of the chain extending agent.

Also, the addition amount of the chain extending agent is not particularly limited and may be properly chosen depending upon the kind and reactivity of the chain extending agent to be used. For example, the chain extending agent may be used in an amount of from about an equimolar amount to a 50-fold molar amount, and preferably from about a 2-fold molar amount to a 25-fold molar amount based on the mole number of the dihydroxy aromatic amide compound.

The reaction conditions of the dihydroxy aromatic amide compound, the diol compound or polyol compound, and the chain extending agent are not particularly limited, and the reaction is usually carried out at from room temperature to 250° C. for from 5 minutes to 100 hours. In this regard, for the purpose of promoting the reaction, the reaction can be carried out in the presence of an ester exchange catalyst such as tetrabutyl titanate.

The weight average molecular weight of the aromatic amide block copolymer of the invention is preferably in the range of from 10,000 to 1,000,000 as reduced into standard polystyrene measured by the gel permeation chromatography because the resulting aromatic amide block copolymer has an excellent balance between the heat aging resistance and the mechanical characteristics.

In the aromatic amide block copolymer of the invention, for the sake of further enhancing the heat resistance, especially the heat discoloration properties, a stabilizer may be added at the time of or after the production. Examples of the stabilizer include phosphorus compounds such as phosphoric acid, phosphorous acid, hypophosphorous acid derivatives, phenylphosphonic acid, phenylphosphinic acid, diphenylphosphonic acid, polyphosphonates, dialkylpentaerythritol diphosphites, and dialkyl bisphenol A diphosphites; hindered phenol based compounds; sulfur-containing compounds such as thioether based compounds, dithionic acid salt based compounds, mercapto benzimidazole based compounds, thiocarbanilide based compounds, and thiodipropionic esters; and tin based compounds such as tin maleate and dibutyltin monoxide. The addition amount of the stabilizer is not particularly limited. In general, it is preferably from 0.01 to 5 parts by weight based on 100 parts by weight of the aromatic amide block copolymer.

Also, in the aromatic amide block copolymer of the invention, for the sake of enhancing the molding properties, a lubricating agent such as stearic acid salts of calcium, barium, aluminum, etc.; stearic esters; silicone oil; waxes, and ethylene bisstearylamide may be added. In general, the addition amount of the lubricating agent is preferably from 0.05 to 5 parts by weight based on 100 parts by weight of the aromatic amide block copolymer.

Further, in the aromatic amide block copolymer of the invention, so far as the object of the invention is hindered, known additives such as thermoplastic resins, fibers, dyes, organic pigments, inorganic pigments, inorganic reinforcing agents, flame retardants, antistatic agents, plasticizers, hindered amine based photo-stabilizers, ultraviolet absorbers, blowing agents, epoxy compounds, and isocyanate compounds can be added.

The aromatic amide block copolymer of the invention can be subjected to molding processing by usual molding methods of thermoplastic resins such as injection molding, extrusion molding, transfer molding, inflation molding, blow molding, heat molding, compression molding, and vacuum molding and can be spread into wide applications such as various molded articles, fibers, films, sheets, plastic modifiers, paints, and adhesives.

The invention is concerned with a novel aromatic amide block copolymer having a specific aromatic amide structural unit as a hard segment, capable of adapting to a broad hardness region ranging from a low hardness to a high hardness and having an excellent balance between heat aging resistance and mechanical characteristics and a process of producing the same.

The invention will be described below in detail with reference to the Examples, but it should not be construed that the invention is limited only to these Examples.

Incidentally, analysis instruments and methods used in the analyses of the aromatic amide block copolymer of the invention are as follows.

(1) Measurement of Molecular Weight:

The molecular weight was measured using a GPC unit (a trade name: HLC-8020, manufactured by Tosoh Corporation) installed with a column (a trade name: TSK-GEL GMHHR-H, manufactured by Tosoh Corporation) and using N-methyl-2-pyrrolidone (hereinafter simply referred to as "NMP") containing 20 mmoles/L of lithium chloride as an eluting solution under conditions of a column temperature of 40° C. and a flow rate of 0.4 mL/min, from which were calculated a number average molecular weight (Mn) and a weight average molecular weight (Mw) as reduced into standard polystyrene.

(2) Measurement of Melting Point (Tm):

The melting point was measured at a rate of temperature rise of 10° C./min in the range of from 40 to 300° C. using a differential scanning calorimeter (a trade name: DSC200, manufactured by Seiko Instruments Inc.).

(3) Hardness:

A sheet having a thickness of 1 mm, which was obtained by compression molding of an aromatic amide block copolymer, was prepared, and its JIS-A hardness was measured using a durometer (a trade name: MICRO DUROMETER MD-1, manufactured by Kobunshi Keiki Co., Ltd.).

(4) Measurement of Nuclear Magnetic Resonance (NMR) Spectrum:

The $^1$H-NMR and $^{13}$C-NMR were measured in dimethyl sulfoxide-$d_6$ using a nuclear magnetic resonance measuring device (a trade name: JNM-GSX270 Model, manufactured by JEOL Ltd.) under conditions of room temperature.

A molar ratio of the aromatic amide unit and the lactone unit was calculated from an intensity ratio of peaks of an aromatic group assigned to an aromatic amide unit and a methylene group assigned to a lactone unit from the resulting $^1$H-NMR spectrum.

(5) Tensile Test:

A specimen was prepared from a sheet having a thickness of 2 mm, which was obtained by compression molding of an aromatic amide block copolymer, and subjected to tensile test according to JIS K6251 (1993), and its breaking strength and breaking elongation were determined.

(6) Heat Aging Resistance Test:

A specimen having a thickness of 2 mm was treated in a gear oven manufactured by Suga Test Instruments Co., Ltd. at 150° C. for 50 hours, and its elongation at breakage was determined according to JIS K6251 (1993). A retention was determined from elongations at breakage before and after the treatment, and this value was defined as an elongation retention.

SYNTHESIS EXAMPLE 1

(Synthesis of Dihydroxy Aromatic Amide Compound)

A 500-mL four-necked flask equipped with a nitrogen introduction pipe, a thermometer and a stirring blade was charged with 54.57 g (500 mmoles) of p-aminophenol and 200 mL of N-methyl-2-pyrrolidone (hereinafter referred to as "NMP"), and the temperature was raised to 50° C. to dissolve the p-aminophenol. 40 mL (500 mmoles) of pyridine was added to the resulting mixture, followed by uniformly stirring. Separately, a 200-mL dropping funnel equipped with a nitrogen introduction pipe was charged with 160 mL of NMP and 50.76 g (250 mmoles) of terephthaloyl chloride, followed by stirring to prepare a uniform solution. This solution was dropped in the preceding solution over 30 minutes while keeping at 50° C. The mixture was further reacted at 50° C. for 2 hours.

A solid of the resulting slurry was recovered by suction filtration, washed twice with 500 mL of methanol with stirring, and dried in vacuo at 80° C. to obtain 82.74 g (percent yield: 95%) of N,N'-bis(4-hydroxyphenyl) terephthalamide. Its structural formula is given below. This compound is designated as "compound (a)".

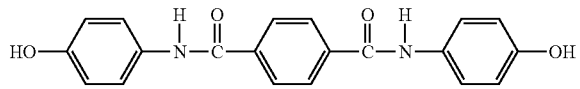

Subsequently, a 500-mL four-necked flask equipped with a nitrogen introduction pipe, a thermometer and a stirring blade was charged with 69.67 g (200 mmoles) of the compound (a), 37.00 g (420 mmoles) of ethylene carbonate, 0.10 g (0.9 mmoles) of potassium t-butoxide as a catalyst, and 400 mL of NMP, and the temperature was raised to 180° C. to completely dissolve the mixture. The solution was further stirred at 180° C. for 2 hours. After cooling to room temperature, the resulting slurry was poured into 1,500 mL of methanol, and a deposited solid was recovered by suction filtration. The recovered solid was washed twice with 500 mL of methanol with stirring, and the resulting solid was recrystallized from NMP and dried in vacuo at 80° C. to obtain 68.54 g (percent yield: 78%) of N,N'-bis(4-(2-hydroxyethoxy)phenyl)-1,4-benzenedicarboxamide. Its structural formula is given below. This compound is designated as "compound (b)".

This solution was cooled to room temperature, to which was then added a solution of 4.1 g (20 mmoles) of terephthaloyl chloride as a chain extending agent and 3.2 g (40 mmoles) of pyridine as a capturing agent of hydrochloric acid formed as a by-product dissolved in 6 mL of NMP, and the mixture was further reacted at room temperature for 13 hours. After completion of the reaction, the solution was diluted and dissolved by the addition of 100 mL of NMP, and the resulting solution was thrown into 1.5 L of methanol. The resulting solid was washed twice with 500 mL of methanol and dried in vacuo at 80° C. to obtain an aromatic amide block copolymer.

The resulting copolymer had a weight average molecular weight (Mw) of 59,000, a ratio of the weight average molecular weight to the number average molecular weight (Mw/Mn) of 1.81, a Tm of 175° C., and a hardness of 95. Also, a molar ratio of the aromatic amide unit to the ε-caprolactone unit was 1/9.9.

EXAMPLE 2

An aromatic amide block copolymer was obtained in the same manner as in Example 1, except for changing the terephthalyl chloride as a chain extending agent to 3.7 g (20 mmoles) of adipoyl chloride.

The resulting copolymer had an Mw of 84,000, an Mw/Mn ratio of 1.86, a Tm of 185° C., and a hardness of 95.

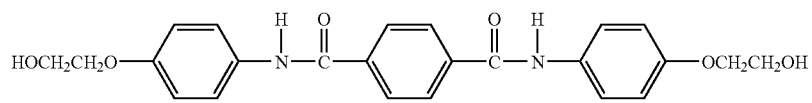

EXAMPLE 1

A 300-mL four-necked flask equipped with a nitrogen introduction pipe, a thermometer and a stirring blade was charged with 8.73 g (20 mmoles) of the compound (b), 22.83 g (200 mmoles) of ε-caprolactone, and 50 mL of NMP, and after raising the temperature to 180° C., 25 mg (0.04 mmoles) of dibutyltin dilaurate was added, and the mixture was subjected to ring-opening polymerization at 180° C. for 8. hours. A solution of a prepolymer having a hydroxyl group at the terminals thereof represented by the following formula was obtained by this reaction. The prepolymer was isolated and subjected to ¹H-NMR spectral analysis. As a result, a molar ratio of the caprolactone unit and the aromatic amide unit [(m+n)/compound (b)] was 9.9.

Also, a molar ratio of the aromatic amide unit to the ε-caprolactone unit was 1/9.3.

EXAMPLES 3 to 10

Aromatic amide block copolymers were obtained in the same manner as in Example 2, except for changing the ring-opening polymerization conditions. Incidentally, the charge amount of the adipoyl chloride was set up at an equimolar amount to the charge amount of the compound (b), and the charge amount of the pyridine was a 2-fold molar amount of the charge amount of the adipoyl chloride. The results obtained are summarized in Table 1.

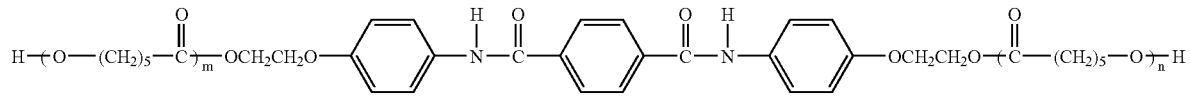

TABLE 1

| | Ring-opening polymerization conditions[1] | | | Characteristics of copolymer | | | | |
|---|---|---|---|---|---|---|---|---|
| | Charge ratio[2] (molar ratio) | Catalyst[3] | Polymerization time (hr) | Formulation ratio[4] (molar ratio) | Mw × $10^{-4}$ | Mw/Mn | Melting point (° C.) | Hardness |
| Example 2 | 10 | A | 8 | 9.3 | 8.4 | 1.86 | 185 | 95 |
| Example 3 | 10 | B | 8 | 9.5 | 13.6 | 1.70 | 220 | 95 |
| Example 4 | 10 | C | 8 | 9.8 | 10.5 | 1.91 | 226 | 95 |
| Example 5 | 5 | B | 1 | 4.9 | 6.2 | 1.72 | 239 | 98 |
| Example 6 | 10 | B | 1 | 9.8 | 21.3 | 1.99 | 209 | 95 |
| Example 7 | 15 | B | 1 | 14.2 | 17.0 | 2.36 | 186 | 90 |
| Example 8 | 20 | B | 1 | 19.4 | 15.2 | 2.26 | 158 | 85 |
| Example 9 | 10 | C | 1 | 9.4 | 17.3 | 2.27 | 203 | 95 |
| Example 10 | 15 | C | 1 | 14.2 | 22.2 | 2.18 | 181 | 90 |

[1]Ring-opening polymerization temperature: 180° C., Catalyst amount: 0.02 mole % based on ε-caprolactone
[2]Charge ratio: Molar ratio of ε-caprolactone/compound (b)
[3]Catalyst A: Dibtutyltin dilaurate
Catalyst B: Monobutyltin tris(2-ethyl hexanoate)
Catalyst C: Tetrabutyl titanate
[4]Molar ratio of ε-caprolactone unit/aromatic amide unit in aromatic amide block copolymer

EXAMPLE 11

A 500-mL four-necked flask equipped with a nitrogen introduction pipe, a thermometer and a stirring blade was charged with 10.00 g (23 mmoles) of the compound (b), 26.25 g (230 mmoles) of ε-caprolactone, and 57 g of NMP, and after raising the temperature to 180° C., 28 mg (0.04 mmoles) of monobutyltin tris(2-ethyl hexanoate) was added, and the mixture was subjected to ring-opening polymerization at 180° C. for one hour to obtain a solution of a prepolymer having a hydroxyl group at the terminals thereof. Thereafter, the temperature was dropped to 80° C., a solution of 5.73 g (23 mmoles) of diphenylmethane-4,4'-diisocyanate as a chain extending agent dissolved in 15 g of NMP was dropped, and the mixture was reacted at 80° C. for 4 hours. After completion of the reaction, the solution was diluted and dissolved by the addition of 150 mL of tetrahydrofuran (hereinafter referred to as "THF"), and the resulting solution was thrown into 1.5 L of methanol. The resulting solid was washed thrice with 1.5 L of methanol and dried in vacuo at 80° C. to obtain an aromatic amide block copolymer.

The resulting copolymer had an Mw of 135,000, an Mw/Mn ratio of 2.40, a Tm of 181° C., and a hardness of 95. Also, a molar ratio of the aromatic amide unit to the ε-caprolactone unit was 1/9.9.

EXAMPLE 12

Ring-opening polymerization was carried out at 180° C. for one hour under the same charge conditions as in Example 11. Thereafter, a solution of 3.85 g (23 mmoles) of hexamethylene diisocyanate as a chain extending agent dissolved in 15 g of NMP was dropped, and the mixture was reacted at 180° C. for 4 hours. After completion of the reaction, the solution was diluted by the addition of 150 mL of THF and 100 mL of NMP, and the resulting solution was thrown into 1.5 L of methanol. The resulting solid was washed thrice with 1.5 L of methanol and dried in vacuo at 80° C. to obtain an aromatic amide block copolymer.

The resulting copolymer had an Mw of 364,000, an Mw/Mn ratio of 2.79, a Tm of 188° C., and a hardness of 95. Also, a molar ratio of the aromatic amide unit to the ε-caprolactone unit was 1/9.9.

EXAMPLE 13

A 500-mL four-necked flask equipped with a nitrogen introduction pipe, a thermometer and a stirring blade was charged with 29.85 g (68 mmoles) of the compound (b), 78.06 g (684 mmoles) of ε-caprolactone, and 180 g of NMP, and after raising the temperature to 180° C., 83 mg (0.14 mmoles) of monobutyltin tris(2-ethyl hexanoate) was added, and the mixture was subjected to ring-opening polymerization at 180° C. for one hour to obtain a solution of a prepolymer having a hydroxyl group at the terminals thereof. Thereafter, a solution of 14.65 g (68 mmoles) of diphenyl carbonate as a chain extending agent dissolved in 10 g of NMP was dropped, and the mixture was reacted at 180° C. for 5 hours. Thereafter, the temperature was raised to 230° C. while distilling off in vacuo NMP and phenol formed as a by-product, and the reaction mixture was further reacted at that temperature for 40 minutes. After returning the reactor to atmospheric pressure using nitrogen, the contents were taken out to obtain an aromatic amide block copolymer.

The resulting copolymer had an Mw of 89,800, an Mw/Mn ratio of 2.08, a Tm of 188° C., and a hardness of 95. Also, a molar ratio of the aromatic amide unit to the ε-caprolactone unit was 1/9.8.

EXAMPLES 14 to 16

Aromatic amide block copolymers were obtained in the same manner as in Example 13, except for changing the diphenyl carbonate to a compound (68 mmoles) shown in Table 2. The results obtained are summarized in Table 2.

TABLE 2

|  | Chain extending agent | Formulation ratio[1] (molar ratio) | Mw × 10$^{-4}$ | Mw/Mn | Melting point (° C.) | Hardness |
|---|---|---|---|---|---|---|
| Example 13 | Diphenyl carbonate | 9.8 | 8.98 | 2.08 | 188 | 95 |
| Example 14 | Dimethyl terephthalate | 9.8 | 6.79 | 2.19 | 179 | 95 |
| Example 15 | N,N'-Terephthaloyl-biscaprolactam | 9.8 | 17.3 | 2.49 | 175 | 95 |
| Example 16 | N,N'-Carbonyl-biscaprolactam | 9.8 | 15.8 | 2.33 | 175 | 95 |

[1]Molar ratio of ε-caprolactone unit/aromatic amide unit in aromatic amide block copolymer

EXAMPLE 17

A solution of a prepolymer having a hydroxyl group at the terminals thereof was obtained in the same manner as in Example 13, except that 83 mg (0.14 mmoles) of monobutyltin tris(2-ethyl hexanoate) was changed to 48 mg (0.14 mmoles) of tetrabutyl titanate and that the ring-opening polymerization time was changed from one hour to two hours. Thereafter, a solution of 24.38 g (68 mmoles) of N,N'-terephthaloylbiscaprolactam dissolved in 10 g of NMP was dropped, and the mixture was reacted at 180° C. for 5 hours. Thereafter, the temperature was raised to 230° C. while distilling off in vacuo NMP and ε-caprolactam, and the reaction mixture was further reacted at that temperature for one hour. After returning the reactor to atmospheric pressure using nitrogen, the contents were taken out to obtain an aromatic amide block copolymer. The results obtained are shown in Table 3.

It has become clear from the results of $^{13}$C-NMR spectral analysis of the resulting copolymer that the caprolactam site of the used terephthaloyl biscaprolactam causes ring opening and acts as a chain extender.

EXAMPLES 18 to 21

Aromatic amide block copolymers were obtained in the same manner as in Example 17, except for changing the charge ratio of the compound (b) and ε-caprolactone. In this case, the charge ratio of the tetrabutyl titanate was set up at 0.02 mole % based on the ε-caprolactone, and the use amount of NMP was set up at 2.63 g based on 1 mmole of the compound (b). In Examples 18 and 19, the reaction temperature after the distillation in vacuo was changed to 250° C. The results obtained are shown in Table 3.

EXAMPLE 22

A 300-mL four-necked flask equipped with a nitrogen introduction pipe, a thermometer and a stirring blade was charged with 5.8 mL (40 mmoles) of adipoyl chloride and 20 mL of NMP under a nitrogen atmosphere, to obtain a uniform solution. Separately, a 200-mL dropping funnel equipped with a nitrogen introduction pipe was charged with 20.76 g (20 mmoles) of poly(oxytetramethylene) polyol (a trade name: PTG-1000SN, manufactured by Hodogaya Chemical Co., Ltd., number average molecular weight: 1,038), 3.2 mL (40 mmoles) of pyridine, and 80 mL of NMP, followed by stirring to prepare a uniform solution. This solution was dropped in the preceding solution over 15 minutes, and the mixture was reacted at room temperature for 3 hours to obtain poly(oxytetramethylene) having an acid chloride group at the both terminals thereof. The reaction product was further reacted at room temperature for 3 hours. Thereafter, 3.2 mL (40 mmoles) of pyridine, 8.73 g (20 mmoles) of the compound (b), and 30 mL of NMP were added, and the mixture was further reacted at 120° C. for 2 hours. After cooling to room temperature, the resulting uniform solution was thrown into 1.5 L of methanol to obtain an aromatic amide block copolymer.

The resulting copolymer had an Mw of 22,600, an Mw/Mn ratio of 1.53, a Tm of 270° C., and a hardness of 94.

EXAMPLE 23

An aromatic amide block copolymer was obtained in the same manner as in Example 22, except for changing the poly(oxytetramethylene) polyol to 19.18 g (20 mmoles) of poly(dimethylsiloxane) polyol (a trade name: X-22-160AS,

TABLE 3

|  | Charge ratio[1] (molar ratio) | Formulation ratio[2] (molar ratio) | Mw × 10$^{-4}$ | Mw/Mn | Melting point (° C.) | Hardness | Breaking strength (MPa) | Breaking elongation (%) |
|---|---|---|---|---|---|---|---|---|
| Example 17 | 10 | 9.8 | 16.2 | 2.37 | 161 | 95 | 48 | 750 |
| Example 18 | 5.3 | 5.2 | 18.6 | 2.57 | 218 | 98 | 73 | 590 |
| Example 19 | 6.5 | 6.4 | 20.4 | 2.82 | 208 | 98 | 60 | 610 |
| Example 20 | 15 | 14.9 | 18.7 | 2.43 | 156 | 91 | 48 | 860 |
| Example 21 | 20 | 19.8 | 19.4 | 2.56 | 140 | 86 | 46 | 910 |

[1]Charge ratio: Molar ratio of ε-caprolactone/compound (b)
[2]Molar ratio of ε-caprolactone unit/aromatic amide unit in aromatic amide block copolymer manufactured by Shin-Etsu Chemical Co., Ltd., number average molecular weight: 959).

The resulting copolymer had an Mw of 33,200, an Mw/Mn ratio of 1.40, a Tm of 258° C., and a hardness of 96.

EXAMPLE 24

An aromatic amide block copolymer was obtained in the same manner as in Example 22, except for changing the poly(oxytetramethylene) polyol to 38.62 g (20 mmoles) of dimer acid polyester polyol (a trade name: PRIPLAST 3192, manufactured by Uniqema, number average molecular weight: 1,931).

The resulting copolymer had an Mw of 23,200, an Mw/Mn ratio of 1.66, a Tm of 224° C., and a hardness of 86.

EXAMPLE 25

An aromatic amide block copolymer was obtained in the same manner as in Example 22, except for changing the poly(oxytetramethylene) polyol to 19.68 g (20 mmoles) of poly(caprolactone) polyol (a trade name: PLACCEL 210N, manufactured by Daicel Chemical Industries, Ltd., number average molecular weight: 984).

The resulting copolymer had an Mw of 43,500, an Mw/Mn ratio of 1.76, a Tm of 244° C., and a hardness of 92.

EXAMPLE 26

An aromatic amide block copolymer was obtained in the same manner as in Example 22, except for changing the poly(oxytetramethylene) polyol to 39.58 g (20 mmoles) of poly(caprolactone) polyol (a trade name: PLACCEL 220N, manufactured by Daicel Chemical Industries, Ltd., number average molecular weight: 1,979).

The resulting copolymer had an Mw of 54,000, an Mw/Mn ratio of 1.84, a Tm of 225° C., and a hardness of 84.

EXAMPLE 27

An aromatic amide block copolymer was obtained in the same manner as in Example 22, except for changing the poly(oxytetramethylene) polyol to 10.48 g (20 mmoles) of poly(caprolactone) polyol (a trade name: PLACCEL 205, manufactured by Daicel Chemical Industries, Ltd., number average molecular weight: 524).

The resulting copolymer had an Mw of 27,900, an Mw/Mn ratio of 1.65, a Tm of 254° C., and a hardness of 94.

EXAMPLE 28

A 300-mL four-necked flask equipped with a nitrogen introduction pipe, a thermometer and a stirring blade was charged with 39.86 g (20 mmoles) of poly(oxytetramethylene) polyol (a trade name: PTG-2000SN, manufactured by Hodogaya Chemical Co., Ltd., number average molecular weight: 1,993) under a nitrogen atmosphere, and the temperature was raised to 80° C. Thereafter, a solution of 9.97 g (40 mmoles) of diphenylmethane-4,4'-diisocyanate dissolved in 30 g of NMP was dropped, and the mixture was reacted at 80° C. for one hour to obtain poly(oxytetramethylene) having an isocyanate group at the both terminals thereof. Further, 8.73 g (20 mmoles) of the compound (b) and 40 g of NMP were added, and the mixture was reacted at 80° C. for 3 hours. After completion of the reaction, the solution was diluted by the addition of 150 mL of THF, and the resulting solution was thrown into 1.5 L of methanol. The resulting solid was washed thrice with 1.5 L of methanol and dried in vacuo at 80° C. to obtain an aromatic amide block copolymer.

The resulting copolymer had an Mw of 141,000, an Mw/Mn ratio of 2.45, a Tm of 210° C., and a hardness of 85. Also, as a result of tensile test, the copolymer exhibited high strength and elongation such that its breaking strength and breaking elongation were 42 MPa and 720%, respectively.

EXAMPLE 29

An aromatic amide block copolymer was obtained in the same manner as in Example 28, except for changing 9.97 g (40 mmoles) of the diphenylmethane-4,4'-diisocyanate to 6.70 g (40 mmoles) of hexamethylene diisocyanate and changing the reaction temperature from 80° C. to 150° C.

The resulting copolymer had an Mw of 152,000, an Mw/Mn ratio of 2.52, a Tm of 205° C./, and a hardness of 85. Also, as a result of tensile test, the copolymer exhibited high strength and elongation such that its breaking strength and breaking elongation were 50 MPa and 800%, respectively.

The aromatic amide block copolymers obtained in Examples 6, 9, 18 and 19 (hereinafter designated to Samples I, II, III and IV, respectively) were subjected to tensile test and heat aging resistance test. The results obtained are summarized in Table 4. It has become clear that all of the samples have high strength and excellent heat aging resistance.

COMPARATIVE EXAMPLE 1

A 1,000-mL four-necked flask equipped with a nitrogen introduction pipe, a thermometer and a stirring blade was charged with 198.4 g of ethyl 4-aminobenzoate and 600 mL of N-methyl-2-pyrrolidone, followed by stirring to prepare a uniform solution. Separately, a 500-mL dropping funnel equipped with a nitrogen introduction pipe was charged with 400 mL of N-methyl-2-pyrroldione and 122.16 g of terephthaloyl chloride, followed by stirring to prepare a uniform solution. This solution was dropped in the preceding solution over 10 minutes. After dropping, 94.87 g of pyridine was added, and the mixture was reacted for 4.5 hours. As a result, a crystal was deposited with the progress of the reaction. The crystal was subjected to suction filtration and then successively washed with 500 mL of N-methyl-2-pyrrolidone and 1,000 mL of acetone, followed by drying in vacuo upon heating at 100° C. for 14 hours. There was thus synthesized N,N'-bis(4-ethoxy-carbonylphenyl)phenylene 1,4-dicarboxamide in a percent yield of 98.0%. Its structural formula is given below. This compound is designated as "compound (c)".

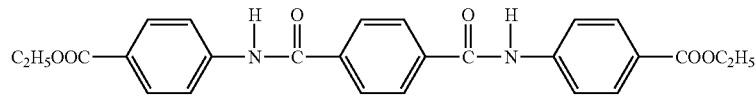

A 500-mL four-necked flask equipped with a nitrogen introduction pipe, a thermometer and a stirring blade was charged with 51.90 g (50 mmoles) of poly(oxytetramethylene) polyol (a trade name: PTG-1000SN, manufactured by Hodogaya Chemical Co., Ltd., number average molecular weight: 1,038) and 23.02 g (50 mmoles) of the compound (c), followed by drying in vacuo at 100° C. Next, 31.75 g of NMP and 88 mg (0.26 mmoles) of tetrabutyl titanate were charged, and the contents were subjected to temperature rise to 210° C. and reacted for 2 hours. Thereafter, the temperature was raised to 230° C. while distilling off in vacuo NMP, and the reaction mixture was further reacted under a reduced pressure of 1 mmHg for 2 hours. After returning the reactor to atmospheric pressure using nitrogen, the contents were taken out to obtain an aromatic amide block copolymer. The resulting copolymer had an Mw of 145,000, an Mw/Mn ratio of 2.30, a Tm of 210° C., and a hardness of 95.

The results of tensile test and heat aging resistance test are shown in Table 4. The resulting copolymer was inferior in heat aging resistance and strength.

COMPARATIVE EXAMPLE 2

A 1-liter three-necked round bottom flask equipped with a reflux condenser was charged with 200 g (1.458 moles) of p-aminobenzoic acid and a large excess amount of 500 mL of thionyl chloride, followed by refluxing for 6 hours. The excess thionyl chloride was distilled off in vacuo to obtain a yellow solid. The resulting yellow solid was distilled under a reduced pressure of from 1 to 2 mmHg to obtain p-sulfinylaminobenzoyl chloride in a percent yield of 95%.

A 3-liter three-necked flask was charged with 144 g (1.27 moles) of ε-caprolactam, 2 L of toluene, and 1 L of pyridine. The mixture was stirred at 0° C. under nitrogen, to which was then added 256.5 g (1.27 moles) of p-sulfinylaminobenzoyl chloride. The mixture was slowly stirred until the temperature reached room temperature and then reacted for 14 hours. A deposited pyridine hydrochloride was filtered off, and the filtrate was washed twice with a 5% sodium hydrogencarbonate aqueous solution. A white residue obtained by distilling off the solvent of the organic phase was recrystallized twice from ethyl acetate to obtain N-(p-aminobenzoyl)caprolactam in a percent yield of 68%.

A 1,000-mL four-necked flask equipped with a nitrogen introduction pipe, a thermometer and a stirring blade was charged with 200 g (0.862 moles) of N-(p-amino-benzoyl)caprolactam, 700 mL of N-methyl-2-pyrrolidone, and 68.18 g (0.862 moles) of pyridine, followed by stirring to obtain a uniform solution. Separately, a 500-mL dropping funnel equipped with a nitrogen introduction pipe was charged with 300 mL of N-methyl-2-pyrrolidone and 87.50 g (0.431 moles) of terephthaloyl chloride, followed by stirring to prepare a uniform solution. This solution was dropped in the preceding solution for a dropping time of 10 minutes. Thereafter, the mixture was reacted for 14 hours. After suction filtration, the residue was successively washed with 500 mL of N-methyl-2-pyrrolidone and 1,000 mL of acetone, followed by drying in vacuo upon heating at 100° C. for 14 hours. There was thus obtained a terminal active aromatic amide (percent yield: 81%). Its structural formula is given below. This compound is designated as "compound (d)".

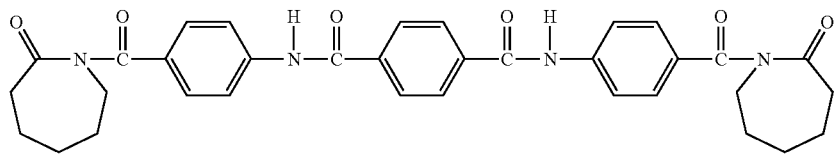

A 500-mL four-necked flask equipped with a nitrogen introduction pipe, a thermometer and a stirring blade was charged with 49.2 g (50 mmoles) of poly(caprolactone) polyol (a trade name: PLACCEL 210N, manufactured by Daicel Chemical Industries, Ltd., number average molecular weight: 984), 29.73 g (50 mmoles) of the terminal active aromatic amide compound (d), and 0.13 g of IRGANOX 1010 (an antioxidant, manufactured by Ciba-Geigy AG), followed by drying in vacuo at 100° C. Next, this flask was charged with 64.9 g of NMP, and the contents were subjected to temperature rise to 210° C. and reacted for one hour. Thereafter, the temperature was raised to 240° C. while distilling off in vacuo NMP and ε-caprolactam, and the reaction mixture was further reacted at that temperature under a reduced pressure of 1 mmHg for one hour. After returning the reactor to atmospheric pressure using nitrogen, the contents were taken out to obtain an aromatic amide block copolymer. The resulting copolymer had an Mw of 151,000, an Mw/Mn ratio of 2.84, a Tm of 205° C., and a hardness of 95.

The results of tensile test and heat aging resistance test are shown in Table 4. The resulting copolymer was inferior in strength.

TABLE 4

| Sample | | Melting point (°C.) | Hardness | Breaking strength (MPa) | Breaking elongation (%) | Elongation retention (%) |
|---|---|---|---|---|---|---|
| Example 6 | I | 209 | 95 | 50 | 700 | 100 |
| Example 9 | II | 203 | 95 | 40 | 680 | 100 |
| Example 18 | III | 218 | 98 | 73 | 590 | 100 |
| Example 19 | IV | 208 | 98 | 60 | 610 | 100 |
| Comparative Example 1 | | 210 | 95 | 21 | 840 | 5 |
| Comparative Example 2 | | 205 | 95 | 19 | 520 | 90 |

While the invention has been described in detail and with reference to specific embodiments thereof, it will be apparent to one skilled in the art that various changes and modifications can be made therein without departing from the spirit and scope thereof.

What is claimed is:

1. An aromatic amide block copolymer comprising an aromatic amide compound unit represented by the following general formula (1):

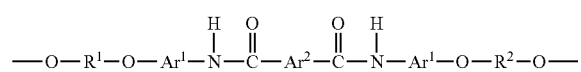
(1)

wherein $R^1$ and $R^2$ each independently represents a divalent alkylene group having from 1 to 20 carbon atoms; and $Ar^1$ and $Ar^2$ each independently represents a divalent arylene group having from 6 to 20 carbon atoms, and a structural unit represented by the following general formulae (2) and/or (3):

$$-G^1-X-G^2- \qquad (2)$$

$$-X-G^3-X- \qquad (3)$$

wherein $G^1$ and $G^2$ each represents a polyester residue; $G^3$ represents a diol compound residue or a polyol compound residue; and X represents at least one chain extending component unit selected from groups represented by the following general formulae (4) to (5):

(4)

wherein $R^3$s each independently represents a divalent alkylene group having from 2 to 20 carbon atoms; $R^4$ represents a carbonyl group or a divalent organic group having from 2 to 20 carbon atoms; and p and q each represents 0 or 1,

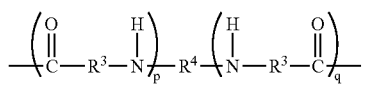
(5)

wherein $R^5$ represents a divalent hydrocarbon group having from 2 to 20 carbon atoms, and having a weight average molecular weight, as reduced into standard polystyrene measured by the gel permeation chromatography, of from 10,000 to 1,000,000.

2. The aromatic amide block copolymer according to claim 1, wherein in the general formula (2), the polyester residue represented by $G^1$ and $G^2$ is a polylactone residue.

3. The aromatic amide block copolymer according to claim 1, wherein in the general formula (3), the diol compound residue or polyol compound residue represented by $G^3$ is at least one diol compound residue or polyol compound residue selected from the group consisting of a poly(oxyalkylene) based polyol residue, a poly(organosiloxane) based polyol residue, an aliphatic hydrocarbon based diol residue, an aliphatic hydrocarbon based polyol residue, an alicyclic hydrocarbon based polyol residue, a polyester based polyol residue, a polycarbonate based polyol residue, and a poly(vinyl ether) based polyol residue.

4. A process of producing an aromatic amide block copolymer according to claim 1 or 2, which comprises reacting a polylactone obtained by heat ring-opening polymerization of a lactone compound represented by the following general formula (7):

(7)

wherein $R^8$ represents a divalent aliphatic hydrocarbon group having 2 to 20 carbon atoms, in the presence of a dihydroxy aromatic amide compound represented by the following general formula (6):

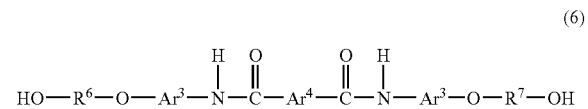
(6)

wherein $R^6$ and $R^7$ each independently represents a divalent alkylene group having from 1 to 20 carbon atoms; and $Ar^3$ and $Ar^4$ each independently represents a divalent arylene group having from 6 to 20 carbon atoms, and a chain extending agent.

5. A process of producing an aromatic amide block copolymer according to claim 1 or 3, which comprises reacting a dihydroxy aromatic amide compound represented by the foregoing general formula (6) and a diol compound or a polyol compound represented by the following general formula (8):

$$HO-R^9-OH \quad (8)$$

wherein $R^9$ represents at least one divalent organic group selected from the group consisting of a poly(oxyalkylene), a poly(organosiloxane), an aliphatic hydrocarbon group, an alicyclic hydrocarbon group, a polyester, a polycarbonate, and a poly(vinyl ether), and a chain extending agent.

6. The process of producing an aromatic amide block copolymer according to claim 4, wherein the chain extending agent is at least one compound selected from the group consisting of a bifunctional acid halide compound, a bifunctional isocyanate compound, a bifunctional carbonate compound, a bifunctional ester compound, a bifunctional acyllactam compound, a bifunctional epoxy compound, and a bifunctional tetracarboxylic acid anhydride.

7. The process of producing an aromatic amide block copolymer according to claim 5, wherein the chain extending agent is at least one compound selected from the group consisting of a bifunctional acid halide compound, a bifunctional isocyanate compound, a bifunctional carbonate compound, a bifunctional ester compound, a bifunctional acyllactam compound, a bifunctional epoxy compound, and a bifunctional tetracarboxylic acid anhydride.

8. The aromatic amide block copolymer according to claim 1, wherein $R^1$ and $R^2$ in formula (1) independently represents an ethylene group, a propylene group, or a trimethylene group.

9. The aromatic amide block copolymer according to claim 1, wherein in formula (1), $Ar^1$ and $Ar^2$ each independently represents at least one of the following groups

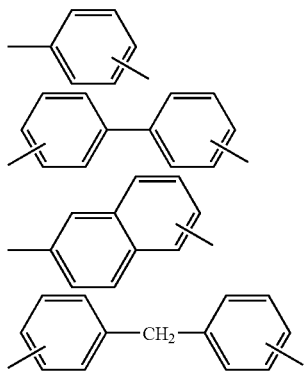

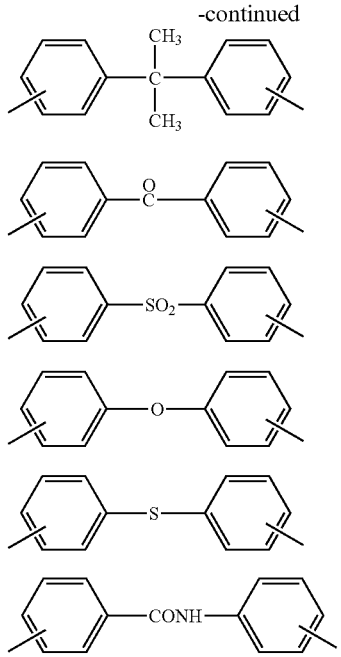

10. The aromatic amide block copolymer according to claim 1, wherein in formula (1), $Ar^1$ and $Ar^2$ each independently represent

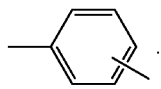

11. The aromatic amide block copolymer according to claim 1, wherein in formula (2), the polyester residue represented by $G^1$ and $G^2$ is a poly(caprolactone) residue.

12. The aromatic amide block copolymer according to claim 1, wherein $G^3$ in formula (3) is a polyol compound residue having a number average molecular weight of from 300 to 10,000.

13. The aromatic amide block copolymer according to claim 1 which is molded.

* * * * *